Patented Nov. 14, 1950

2,529,851

UNITED STATES PATENT OFFICE 2,529,851

ADHESIVE COMPOSITION

Paul H. Scrutchfield, Hannibal, Mo., assignor to American Cyanamid Company, New York, N. Y., a corporation of Maine No Drawing. Application June 14, 1949, Serial No. 99,117

5 Claims. (Cl. 260—9)

This invention relates to a potentially adhesive material particularly adaptable for use in processes for continuously forming weather proof fiber board and more particularly, for use in the process of continuously forming weather proof corrugated fiber board.

The object of the present invention is to produce a potentially adhesive material which, when used in the production of weather proof corrugated fiber boards, results in a product which displays improved stability even after extended exposure to weather or water immersion. A further object of the present invention is to utilize this new potential adhesive material to produce a weather proof corrugated fiber board at an increased rate of production thereby increasing economical output of such corrugated fiber board. A further object of this invention is to improve the process of continuously forming weather proof corrugated paper board by the application of a potential adhesive to the apices of the corrugations, which adhesive contains a starch ketone-formaldehyde resin mixture in an aqueous solution whose pH is critically controlled between the limits of 10 and 12.5. A further object of the invention is to control the gelation temperature of the ungelatinized starch in the potential adhesive mixture in solution to a critical value between 140° F. and 158° F. A still further object of the present invention is to produce a potentially adhesive material which is capable of setting upon the application of sufficient heating in a period of time varying between less than 1 second and 10 seconds.

Cognizance is taken of the prior art, particularly with respect to the Patents 2,051,025, 2,102,-937, and 2,212,557, the patentee of which is Jordan V. Bauer.

During the early part of World War II, there developed a critical need for an adhesive composition which could be utilized in the production of corrugated fiber board which would withstand extended exposure to the varying weather conditions of nearly all climates. Such a potential adhesive material, when used in the production of the weather proof corrugated fiber board, was needed which could withstand the hot, humid conditions of the tropics, the cold rain and snow of the northern temperate zones, and even submersion in the coastal waters at the landing beaches of the far flung battle areas without disintegration of containers, so as to assure a steady flow of protected supplies to our armed forces.

The corrugated fiber board industry, faced with the problem, developed several potential adhesive materials which were adaptable for use generally to produce a weather proof type of corrugated fiber board. In certain instances, to accomplish the desired result, it was necessary to decrease machine speeds from their normal rate of 300–325 ft. per minute to 150 ft. per minute and oftentimes less. This necessitated an increased cost in production. This decrease in the speed of production was due primarily to the fact that it was necessary, in the application of the single facer to the corrugated strip, to slow down the production of the paper board in order that the heat application rolls would have sufficient time to transmit their heat to the adhesive materials in order that the gelation temperature of the ungelatinized starch could be reached, thereby transforming the potential adhesive material into a bonding material. It was considered possible to elevate the temperature of the heating rolls to such a level that the period of contact with the heated rolls in the application of the single facer to the corrugations be accomplished in a shorter period of time. This would necessitate elevating the temperatures of the rolls oftentimes to temperatures as high as 400° F. and even higher. This modification may enable the industry to increase the speed of production by eliminating or at least diminishing one of the factors which caused an increase in the cost of production. It would introduce, however, another cost factor, namely, the factor of heating at higher temperatures, to the cost of production.

The applicant has discovered that by using a ketone formaldehyde resin, which is an alkaline curing resin, that he is able to control the pH of the starch resin adhesive material within the range of 10 to 12.5, that a cure to the resin could be accomplished within that pH range and that he simultaneously lowered the gelation temperature of the ungelatinized portion of the starch in the starch resin adhesive, thereby increasing the rate of production of the corrugated fiber board, improving the product produced and escaping the necessity for using the high temperatures previously required to accomplish the bonding operation. The applicant has discovered further that by use of his potential adhesive material he can accomplish the bonding operation while using temperatures on the heating rolls varying between 275° F.–325° F. and that the adhesive material is capable of setting within less than 1 second to 10 seconds.

In some of the known processes for the production of weather proof corrugated fiber board, it has been common practice to maintain the pH of the starch solution within the range of about 3 to 7. This has been necessitated because of the use of acid curing resins as an essential component in such starch resin adhesives. It is to be noted, however, that by using such pH values on the acid side an elevation of the gelation temperatures of the ungelatinized proportion of the starch to 180° F.–190° F. has resulted.

The use of a starch resin solution with such a relatively low pH value results in a lower development of tackiness of the solution which in turn results in a considerable slowing down of the process of the production of the fiber board itself. By using a starch paste with a pH value between 10 and 12.5, there results a lowering of the gelation temperature of the ungelatinized starch to such a point that one is enabled to operate the corrugated fiber board producing machines at higher speeds without the use of excessive temperatures in the heating rolls. Ordinarily in the production of corrugated fiber board, it is desired to heat the potentially adhesive material to a temperature of about 110° F.–120° F. without causing the starch to gel so that in the subsequent use of the starch solution in its application to the apices of the corrugations, the momentary heating to 140° F. to 158° F. results in an almost instantaneous gelation. This almost instantaneous gelation enables the single facer to be applied to the corrugated portion and to be so completely bonded thereto that the machine speeds can be considerably stepped up.

The alkaline condition of the starch solution can be accomplished by adding various quantities of alkali such as caustic soda, potassium hydroxide, and the like. Although the pH range of the starch resin solution must be between 10 and 12.5, better results are accomplished when the pH range is more critically controlled between the range of 11 and 11.5, with a pH range of 11.3 producing optimum results. If, in the preparation of the starch resin adhesive material, the pH should happen to exceed 12.5, the pH can be lowered to the desired level by the addition of acidic materials such as formic acid, hydrochloric acid and the like.

In order that there may be a more complete understanding of this invention, more detailed explanations and formulations will be set forth hereinbelow. It must be remembered, however, that the following detailed examples are by way of illustration only and are not to be considered as limitations on the case except as indicated in the appended claims. All parts referred to hereinbelow are parts by weight.

THE PREPARATION OF THE STARCH RESIN ADHESIVE

The starch resin adhesive is ordinarily prepared in two separate portions which are then combined as indicated hereinbelow.

Mixture No. I—A

Into a mixer, introduce 90 parts of water at about 90° F. and add thereto 35 parts of a partially hydrolyzed starch. Slurry the two ingredients, then add about 50 parts of a 10% solution of caustic soda, and stir until the mixture has become completely gelatinized. Add about 140 parts of water while maintaining the temperature at about 90° F. and mix by stirring until the entire mixture is smooth.

Mixture No. II—A

Introduce into a mixer, 40 parts of water containing 5 parts of dissolved commercial borax, maintain the temperature at 90° F., add thereto 140 parts of an ungelatinized starch such as a pearl type starch and mix the components until the ungelatinized starch is thoroughly dispersed in the water.

The working mixture—I

Add the contents of Mixture No. I—A to Mixture No. II—A and stir until a substantially homogeneous mixture results. The pH of this mix should be about 11 to 11.5. If, for any reason, the pH of the mixture is outside of that range, it may be modified by the appropriate addition of acid or alkali whichever the case may require. To this mixture is then added about 17.5 parts of acetone formaldehyde resin syrup containing approximately 50% solids. (This represents about 5% solids resin based on the starch solids content). The mixture is then stirred until the resin is dispersed throughout the starch solution. The pH must be again adjusted to the range of about 11 to 11.5, if necessary, by the addition of caustic or acid as the case may require. Since the resin used is in a liquid state, a sufficient amount of the resin solution should be added to bring the resin solids to about 2.5% to 20% by weight based on the starch solids content, with 5% to 10% preferred.

As an alternative method for the preparation of the starch resin adhesive as indicated hereinabove the following will serve to illustrate a modification of the process for the preparation of the adhesive.

Mixture No. I—B

Into a mixer introduce 1430 parts of water at about 90° F., and add thereto 120 parts of a partially hydrolyzed starch and 120 parts of an ungelatinized starch. Mix until uniformly dispersed. Add 30–40 parts of caustic soda (the exact amount depending on the quantities necessary to obtain a gel temperature) of the ungelantinized starch of about 90° F. Mix the components by stirring until the entire mixture is gelatinized.

Mixture No. II—B

Introduce into a mixer 3000 parts of water, 820 parts of an ungelatinized starch. Add from 17–35 parts of borax (the exact amount depending on the quantity necessary to get the desired consistency when the resin has been added).

The working mixture—B

Add the contents of Mix No. I—B to Mix No. II—B and stir until a substantially homogeneous mixture results. The pH of this mixture is adjusted to about 11 to 11.5. Add 106 parts of a formaldehyde methyl ethyl ketone resin syrup (containing 50% solids) having a mol ratio of 2:1. (This represents about 5% solids resin based on the total starch solids content). The mixture is then stirred until the resin is substantially dispersed throughout the starch solution. The pH must then be again adjusted to the range of 11 to 11.5, if necessary, by the addition of alkali or acid as the case may require.

The preparation of the starch resin adhesive used in the practice of the process of this invention could be further modified as shown in the following example.

Mixture I—C

Into a mixer introduce the following materials: 143 parts of water, 12 parts of partially hydrolyzed starch, 12 parts of an ungelatinized starch, 3 parts of sodium hydroxide. The temperature of the mix is controlled to about 90° F. and the starches are gelatinized by use of good agitation which is continued until the mixture is quite smooth.

Mixture II—C

Into a mixer introduce the following materials: 307 parts water, 82 parts of an ungelatinized starch, and 3.5 parts borax. The ungelatinized starch is then slurried in water, the borax functioning as a control of consistency. While maintaining constant stirring in the second mixture, Mix No. I—C is added and stirring is continued until a substantially homogeneous mass results. At this point about 9.3 parts of acetone formaldehyde resin syrup (containing 80% solids) is added. This represents about 7.5% solids based on the total starch solids. The mixture is stirred until the resinous material is completely dispersed throughout the paste. The pH of the starch resin paste is then adjusted, if necessary, to a pH of about 11 to 11.5.

When the above working mix is used on a standard corrugating machine, the paper board made therefrom will withstand prolonged soaking in water at room temperature without delamination. The speed of the operation of the corrugating machine is considerably increased with the use of this resin modified starch paste because of the lowering of the gelation temperature of the ungelatinized portion of the starch in the paste and because the particular pH used gives the fastest development of tack to the starch used.

The effect of the addition of borax to the starch is two-fold, first it operates as a buffer effect, but more important it gives a better tack development to the starch. The amount of the borax present should be between 1% and 4% by weight based on the total dry weight of the starch.

The ratio of the ungelatinized starch to the partially hydrolyzed starch carrier may be varied considerably, for instance, it is possible to use one part by weight of the ungelatinized starch base to 5 parts by weight of the partially hydrolyzed starch carrier; or 1 part by weight of the partially hydrolyzed starch carrier to about 4 parts by weight of the ungelatinized starch base. The amount of water present in the adhesive composition may be varied over the range of between 2 parts of water for each part of the total starch solids materials present to 5 parts of water to 1 part of the total starch solids materials present with 4:1 preferred. It is further preferred that the ungelatinized starch present in the adhesive mix be considerably greater than the amounts of the partially hydrolyzed starch used so that when the ungelatinized starch reaches its gelation temperature and gels on the apices of the corrugations upon the instantaneous application of heat, a considerable amount of the unbound water in the mix becomes absorbed into the gelatinizing starch thereby forming a good bonding mixture at the moment of application of the paper liner to the corrugated core, whether it be the single facer or the double backer that is being applied. This is more particularly true in the instance of the application of the single facer because the period of time during which the potential adhesive is exposed to the elevated temperatures in the application of the single facer is quite short in comparison to the amount of time during which the adhesive mix is exposed to the elevated temperatures when the double backer is being applied.

I have discovered that the ketone formaldehyde resins are particularly applicable in water proofing adhesive compositions when used in the production of corrugated fiber boards. Amongst those ketone formaldehyde resins which may be used in the practice of the process of this invention are the following: Formaldehyde-acetone with a mol ratio of 1:1 to 6:1, formaldehyde-methyl ethyl ketone with mol ratios of between 1:1 to 4:1, formaldehyde-cyclohexanone with mol ratios of between 1:1 to 5:1. These ketone-formaldehyde resins may be prepared in any suitable manner known in the art and the following examples will serve to show in greater detail the actual preparation of the acetone-formaldehyde resins. These examples are given by way of illustration only and are not to be interpreted as limitations on the case except as indicated by the appended claims. All parts are parts by weight. It has been indicated hereinabove that the mol ratios of the ketone formaldehyde resin may be varied between 1:1 to 1:6, respectively but a range of 1:2 and up to 1:4 mols of ketone to formaldehyde respectively is preferred from the standpoint of speed of production.

Resin A 7 parts of potassium carbonate are dissolved in 290 parts of formalin (37% formaldehyde in aqueous solution). This solution is slowly added to 115 parts of acetone while the temperature is held at 50° C. After the addition of the formalin and catalyst solution is completed, the reaction mixture is maintained at 50° C. until the free formaldehyde is about 2–3%. The reaction mixture is neutralized to a pH of about 6 with concentrated hydrochloric acid. It is then vacuum concentrated to a viscosity of E on the Gardner-Holdt scale. The mol ratio of this example is about 1:1.8 ketone to formaldehyde and the resin solution contains approximately 56% solids.

Resin B 250 parts of formalin (37% formaldehyde by weight of aqueous solution) and 44 parts of acetone are charged into a reaction vessel, 6 parts of potassium carbonate are added to the reaction mixture. The temperature is allowed to rise to reflux via the exotherm with intermittent cooling as necessary to avoid too rapid a temperature rise. This reaction is held at reflux until the free formaldehyde is about 4–5%. The resinous solution is then cooled and then neutralized to a pH of about 6 with concentrated hydrochloric acid. The resin syrup is then vacuum concentrated to a viscosity of F on the Gardner-Holdt scale. The mol ratio is approximately 1:4 acetone to formaldehyde, and has a solids content of about 76%.

Resin C 25 parts of acetone and 213 parts of formalin (37% formaldehyde by weight of aqueous solution) are charged into a reaction vessel, 5 parts of potassium carbonate are added to catalyze the reaction. The reaction mixture is heated to 40° C. and then allowed to rise to reflux temperature via the exotherm. The reaction is maintained at reflux temperature until the free formaldehyde is about 11–12% by weight based on the total weight of the resinous solution. The resinous solution is then vacuum concentrated to a viscosity of about J on the Gardner-Holdt scale. This resin has an approximate mol ratio of 1:6 acetone to formaldehyde respectively and has a solids content of about 81%, determined by a vacuum desiccation at room temperature for 16–20 hours.

The examples set forth above indicate that in the preparation of the ketone formaldehyde resins the mol ratios of ketone to formaldehyde may be varied widely. One of the more important considerations in determining the particular mol ratio to be used in the preparation of the resin can be determined by examining the gelling characteristics of the resins. The gel time of these resins with varying mol ratios can be tested by catalyzing a 10 gram sample of the resin with 10 drops of 40% sodium hydroxide solution. Table I set forth hereinafter shows the relations between mol ratios of the resins and the gel time of the resin when the above test has been applied. Upon the addition of the caustic solution to the resin sample a visual study of the changes that take place in the resin at room temperature is the determining criteria. It will be noted that the gel time decreases with decreasing mol ratio of formaldehyde to ketone. It will also be apparent that the gel time has no effect on the average paper board performance, said paper board performance being determined by the application of the following criteria: 10=perfect, 6=satisfactory, and 1=no good.

TABLE I

*Effect of mol ratio on gel time*

| Mol Ratio HCHO Acetone | Reaction Temp., °C. | Average Paperboard Performance | Gel Time | Remarks |
|---|---|---|---|---|
| 6:1 | 60 | 7 | 3 days | Hydrophobed on gelling. |
| 5:1 | 60 | 7 | 3 days | Do. |
| 4:1 | 50 | 7 | 3 hours | Hydrophobed at 2 hrs. |
| 3:1 | 60 | 7 | 74 min. | Hydrophobed at 30 min. |
| 1.78:1 | 50 | 6 | 7 min. | Hydrophobed and then gelled. 2 phases. |
| 1:1 | 50 | 7 | 5 min. | Do. |

The temperature of reaction of the ketone and formaldehyde also affects the gel time as is shown in Table II hereinbelow. This data shows that the higher the temperature of reaction the shorter the gel time of the resin. It is to be noted, however, that the temperature of reaction does not appear to affect the performance of the resin in the starch resin adhesive bond as observed in the average paper board performance column.

TABLE II

*Effect of reaction temperature on gel time*

| Reaction Temp. °C. | Mol Ratio | Average Paperboard Performance | Gel Time | Remarks |
|---|---|---|---|---|
| 50 | 4:1 | 7 | 3 hours | Hydrophobed at 2 hours. |
| 70 | 4:1 | 7 | 76 min. | Thickened slowly, hydrophobed, then gelled. |
| Reflux | 4:1 | 7 | 7 min. | Clouded, thickened, and gelled. |
| 60 | 3:1 | 7 | 74 min. | Hydrophobed at 30 minutes. |
| Reflux | 3:1 | 7 | 6 min. | Clouded and gelled syneresis. |

*Effect of mol ratio of paperboard performance*

The performance of the ketone-aldehyde resin of varied mol ratios of formaldehyde to acetone is shown in Table III. It would appear from these results that the mol ratio has no appreciable effect on the paperboard performance.

TABLE III

*Effect of mol ratio on paperboard performance*

| Mol Ratio HCHO/Acetone [1] | Paperboard Performance [2] Press Time in Seconds at 130° C. | | | | | |
|---|---|---|---|---|---|---|
| | 2 | 3 | 4 | 5 | 10 | 15 |
| 6:1 | 4 | 7 | 7 | 7 | 7 | 7 |
| 5:1 | 6 | 6 | 7 | 7 | 7 | 7 |
| 4:1 | 3 | 6 | 7 | 7 | 7 | 7 |
| 3:1 | 5 | 7 | 7 | 7 | 7 | 7 |
| 1.78:1 | 5 | 6 | 6 | 8 | 6 | 6 |
| 1:1 | 6 | 7 | 6 | 7 | 7 | 7 |

[1] Resins reacted at temperatures of 50–60° C.
[2] 10=perfect, 6=satisfactory, 1=no good.

It is to be noted that the rate of speed corrugating machines can be run is directly related to the pH of the starch paste used or to the temperature of the heating rolls which contact the layers of paper after the potential adhesive has been applied to the apices of the corrugations. Considering the aspect of the pH, the use of a starch resin adhesive with a pH of about 4 to 6 is so slow in developing the tack of the starch resin paste at the temperatures normally used in the heating roll that the machine cannot be operated at speeds appreciably greater than 125 to 150 ft. per minute. At an alkaline pH of about 11, the rate of development of tack is increased to a point at which the machine can be operated at about 325 ft. per minute. The economics of the paper board industry necessitates the use of higher machine speeds without the use of higher temperatures in the heating rolls.

It has been pointed out that the gelatinization temperature of the ungelatinized portion of the starch in the starch resin adhesive be controlled within the range of 140–158° F. However, for optimum speeds, it is preferred that the gelatinization temperature be controlled at a level below 158° F. and specifically in the vicinity of 140° F. to 147° F.

In place of the borax, it is possible to substitute other comparable materials which will function in much the same manner, such as sodium aluminate as well as other soluble borates and aluminates.

The carrier portion of the adhesive mix has been identified as a gelatinzed starch solution which is in the nature of a viscous hydrogel or hydrosol medium, the consistency of which should be sufficient to enable it to carry in suspension not only the ungelatinized portion of the starch present but also the dispersible resin in such complete mixture that a homogeneous smooth mass results. In addition to the gelatinized starch solution used as a carrier, there may be substituted wholly or in part dextrins, starch gums, vegetable gums such as gum arabic, locust bean gum, agar-agar, Irish moss, gum karaya, and certain glutens and gelatins.

The consistency of the starch resin adhesive is affected somewhat by the addition of the resin to the starch solution at lower temperatures such as 70° F. and no appreciable change in consistency is noted even when the temperature is raised to 90° F. However, at temperatures of 110° F. to 120° F. the starch resin adhesive has about the same consistency as the starch adhesive would have at that temperature without benefit of the resin so that no appreciable difference is to be noted between the consistency of the starch resin adhesive and the starch adhesive at temperatures of 110–120° F. and no compensation need be made, for varying consistencies due to the presence of the resin, at the higher temperatures. In order to demonstrate this point, the following chart will show the measured consistencies of the starch paste alone in comparison with the starch paste containing 5% of the ketone formaldehyde resin. The test was applied by timing the flow of 100 ccs. of the paste through the orifice in the bottom of a test cylinder designed for use in the corrugating industry. These tests were run at 70, 90, 110, and 120° F.

TABLE 1

*Consistency of starch and resin starch formulations*

| Formulation | Consistency, 70° F. | Cup Test, Seconds | | |
|---|---|---|---|---|
| | | 90° F. | 110° F. | 120° F. |
| Starch Paste | 482 | 108 | 55 | 40 |
| Starch Paste+5% solids ketone-formaldehyde resin | 955 | 148 | 55 | 42 |

It should be noted at this time that the addition of the borax to the starch resin paste causes the consistency to increase materially with increasing amounts of borax added. The addition of the borax, besides increasing the consistency of the paste, serves further to improve the paper board bond.

I claim:

1. An adhesive composition, adaptable for use in the manufacture of water resistant corrugated fiber board comprising from 1 to 5 parts by weight of a partially hydrolyzed starch, from 1 to 4 parts by weight of an ungelatinized starch base and from 1% to 4% by weight of borax based on the total starch solids used, in aqueous dispersion with 2.5% to 20% solids by weight of a ketone-formaldehyde resin, wherein said ketone is a member of the group acetone, methyl ethyl ketone, and cyclohexanone, having a mol ratio of 1:1 to 1:6 respectively, said percentage by weight being based on the total amount of starch solids present and in which the water present in relation to the total starch solids present is within the ratio of 2:1 to 5:1 respectively and said dispersion having a pH of between 10 and 12.5 and a thin film of said adhesive being capable of setting at a temperature varying between 140° F. and 158° F. in from less than 1 second to 10 seconds.

2. An adhesive composition, adaptable for use in the manufacture of water resistant corrugated fiber board, comprising from 1 to 5 parts by weight of a partially hydrolyzed starch, from 1 to 4 parts by weight of an ungelatinized starch base and from 1% to 4% by weight of borax based on the total starch solids used, in aqueous dispersion with from 5% to 10% solids by weight of a ketone-formaldehyde resin, wherein said ketone is a member of the group acetone, methyl ethyl ketone, and cyclohexanone, having a mol ratio of 1:1 to 1:6 respectively, said percentage by weight being based on the total amount of starch solids present, and in which the water present in relation to the total starch solids present is within the ratio of 2:1 to 5:1 respectively and said dispersion having a pH of between 11 to 11.5 and a thin film of said adhesive being capable of setting at a temperature varying between 140° F. and 147° F. in from less than 1 second to 10 seconds.

3. An adhesive composition, adaptable for use in the manufacture of water resistant corrugated fiber board, comprising from 1 to 5 parts by weight of a partially hydrolyzed starch, from 1 to 4 parts by weight of an ungelatinized starch base and from 1 to 4% by weight of borax based on the total solids starch used, in aqueous dispersion with from 2½% to 10% by weight of an acetone-formaldehyde resin having a mol ratio of 1:1 to 1:6 respectively, said percentage by weight being based on the total amount of starch solids present, and in which the water present in relation to the total starch solids present is within the ratio of 2:1 to 5:1 respectively and said dispersion having a pH of between 11 to 11.5 and a thin film of said adhesive being capable of setting at a temperature varying between 140° F. and 147° F. in from less than 1 second to 10 seconds.

4. An adhesive composition, adaptable for use in the manufacture of water resistant corrugated fiber board, comprising from 1 to 5 parts by weight of a partially hydrolyzed starch, from 1 to 4 parts by weight of an ungelatinized starch base and from 1 to 4% by weight of borax based on the total solids starch used, in aqueous dispersion with from 2½% to 10% by weight of a methyl ethyl ketone formaldehyde resin having a mol ratio of 1:1 to 1:4, respectively, said percentage by weight being based on the total amount of starch solids present, and in which the water present in relation to the total starch solids present is within the ratio of 2:1 to 5:1, respectively and said dispersion having a pH of between 11 to 11.5 and being capable of setting at a temperature varying between 140° F. and 147° F. in from less than 1 second to 10 seconds.

5. An adhesive composition, adaptable for use in the manufacture of water resistant corrugated fiber board, comprising from 1 to 5 parts by weight of a partially hydrolyzed starch, from 1 to 4 parts by weight of an ungelatinized starch base and from 1 to 4% by weight of borax based on the total solids starch used, in aqueous dispersion with from 2½% to 10% by weight of a cyclohexanone-formaldehyde resin having a mol ratio of 1:1 to 1:5, respectively, said percentage by weight being based on the total amount of starch solids present, and in which the water present in relation to the total starch solids present is within the ratio of 2:1 to 5:1, respectively, and said dispersion having a pH of between 11 to 11.5 and being capable of setting at a temperature varying between 140° F. and 147° F. in from less than 1 second to 10 seconds.

PAUL H. SCRUTCHFIELD.

REFERENCES CITED

The following references are of record in the file of this patent:

UNITED STATES PATENTS

| Number | Name | Date |
|---|---|---|
| 2,051,025 | Bauer | Aug. 18, 1936 |

Certificate of Correction

Patent No. 2,529,851 November 14, 1950

PAUL H. SCRUTCHFIELD

It is hereby certified that error appears in the printed specification of the above numbered patent requiring correction as follows:

Column 3, line 2, for the word "lower" read *slower*; column 4, line 34, for "30–40" read *30–45*; column 7, line 10, for "hereinafter" read *hereinbelow*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*